United States Patent
Anders et al.

(10) Patent No.: US 11,157,701 B2
(45) Date of Patent: Oct. 26, 2021

(54) REGULATING VELOCITY OF CHAT DISCOURSE

(71) Applicant: INTERNATIONAL BUSINESS MACHINES CORPORATION, Armonk, NY (US)

(72) Inventors: Kelley Anders, East New Market, MD (US); Jeremy R. Fox, Georgetown, TX (US); Jonathan Dunne, Dungarvan (IE); Liam S. Harpur, Skerries (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 135 days.

(21) Appl. No.: 16/245,166

(22) Filed: Jan. 10, 2019

(65) Prior Publication Data
US 2020/0226217 A1    Jul. 16, 2020

(51) Int. Cl.
*G06F 40/30* (2020.01)
*H04L 12/58* (2006.01)
*H04L 12/18* (2006.01)

(52) U.S. Cl.
CPC .......... *G06F 40/30* (2020.01); *H04L 12/1822* (2013.01); *H04L 51/046* (2013.01); *H04L 51/16* (2013.01)

(58) Field of Classification Search
CPC .... G06F 40/211; G06F 40/253; G06F 40/268; G06F 40/284; G06F 40/30
See application file for complete search history.

(56) References Cited

U.S. PATENT DOCUMENTS

| | | | |
|---|---|---|---|
| 8,782,157 B1 * | 7/2014 | Hansen | H04L 51/32 709/206 |
| 10,708,216 B1 * | 7/2020 | Rao | G06Q 50/01 |
| 10,735,363 B1 * | 8/2020 | Knas | H04L 51/22 |
| 10,965,629 B1 * | 3/2021 | Bekmambetov | G06F 40/166 |

(Continued)

FOREIGN PATENT DOCUMENTS

| | | |
|---|---|---|
| CN | 107040450 B | 8/2017 |
| WO | 2017192684 A1 | 11/2017 |
| WO | 2018018523 A1 | 2/2018 |

OTHER PUBLICATIONS

O'malley, C. et al., "Comparison of face-to-face and video-mediated interaction," In Interacting with Computers, Jun. 8, 1996, vol. 8, No. 2, pp. 177-192, retrieved from the Internet: <http://citeseerx.ist.psu.edu/viewdoc/download?doi=10.1.1.891.7666&rep=rep1&type=pdf>.

(Continued)

*Primary Examiner* — Lamont M Spooner
(74) *Attorney, Agent, or Firm* — Cuenot, Forsythe & Kim, LLC

(57) ABSTRACT

Regulating velocity of chat discourse can include determining, using computer hardware, a topic and emotive content from a plurality of chat messages of a group chat, determining, using the computer hardware, time deltas between different ones of the plurality of chat messages, determining, using the computer hardware, a tempo and a tempo adjustment for the group chat based on the topic, the emotive content, and the time deltas, and indicating, using the computer hardware, the tempo adjustment to a client device of a participant in the group chat.

20 Claims, 8 Drawing Sheets

(56) References Cited

U.S. PATENT DOCUMENTS

| | | | |
|---|---|---|---|
| 2006/0136545 A1* | 6/2006 | Reistad | G06Q 30/02 709/200 |
| 2007/0262860 A1 | 11/2007 | Salinas et al. | |
| 2010/0299326 A1* | 11/2010 | Germaise | G06F 16/9535 707/728 |
| 2013/0117389 A1* | 5/2013 | Yamada | G06Q 10/107 709/206 |
| 2014/0047049 A1* | 2/2014 | Poston | H04L 51/32 709/206 |
| 2015/0195232 A1* | 7/2015 | Haugen | H04L 51/12 709/206 |
| 2016/0124925 A1* | 5/2016 | Fleischman | G06F 3/0482 715/738 |
| 2016/0379222 A1* | 12/2016 | Chauhan | G06F 16/288 705/304 |
| 2017/0039242 A1* | 2/2017 | Milton | G06Q 30/0269 |
| 2017/0104843 A1* | 4/2017 | Cardillo | H04L 67/325 |
| 2017/0192684 A1 | 7/2017 | Grube et al. | |
| 2017/0237785 A1* | 8/2017 | Peng | H04L 51/04 709/206 |
| 2017/0364741 A1* | 12/2017 | Hau | G06K 9/72 |
| 2018/0018523 A1 | 1/2018 | Shekhar et al. | |
| 2018/0219818 A1* | 8/2018 | Kramer | G06Q 30/0277 |
| 2019/0065610 A1* | 2/2019 | Singh | H04L 51/32 |
| 2019/0149494 A1* | 5/2019 | Anders | H04W 4/12 704/9 |
| 2019/0268174 A1* | 8/2019 | Szeredi | H04L 12/1822 |
| 2020/0036761 A1* | 1/2020 | Weinwurm | H04L 51/04 |
| 2020/0076759 A1* | 3/2020 | Kwatra | H04L 51/32 |
| 2021/0097240 A1* | 4/2021 | Singh | G06F 40/30 |

OTHER PUBLICATIONS

Gallessich, G., "Frontal Lobe of the Brain is Key to Automatic Responses to Various Stimuli, Say Scientist," UCSB Laboratory for Computational Cognitive Neuroscience, retrieved Aug. 16, 2018, retrieved from the Internet: <http://www.news.ucsb.edu/2010/012921/frontal-lobe-brain-key-automatic-responsesvarious-stimuli-say-scientists>, 2 pg.

Tat, A. et al., "Visualising human dialog," In proceedings of IEEE 6th Int'l. Conf. on Information Visualisation, 2002, pp. 16-21, retrieved from the Internet: <https://pages.cpsc.ucalgary.ca/~sheelagh/personal/pubs/2002/tat-carp-IV02.pdf>.

"What is the optimal response time in live chat?" Giosg.com LTD. © 2016, retrieved Aug. 16, 2018, retrieved from the Internet: <https://www.giosg.com/find-answers/what-is-the-optimal-response-time-in-live-chat>, 1 pg.

* cited by examiner

REGULATING VELOCITY OF CHAT DISCOURSE

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

This disclosure relates to chat technology and, more particularly, to regulating the velocity of chat discourse in a group chat.

Real time chat applications enjoy widespread use in many areas of life. In the workplace, for example, users rely heavily on chat applications to communicate with co-workers. Users are able to join different group chats to discuss various work-related projects and/or responsibilities. Use of chat applications, however, is not limited to the workplace. Chat applications also enjoy widespread acceptance in social systems and/or networks. Chat applications can be particularly useful in cases where the participants in a given group chat are geographically dispersed. Regardless of the context, group chats facilitate ongoing conversations between participants and allow the participants to communicate about a wide variety of subjects and/or issues of importance.

SUMMARY

In one or more embodiments, a method includes determining, using computer hardware, a topic and emotive content from a plurality of chat messages of a group chat, determining, using the computer hardware, time deltas between different ones of the plurality of chat messages, determining, using the computer hardware, a tempo and a tempo adjustment for the group chat based on the topic, the emotive content, and the time deltas, and indicating, using the computer hardware, the tempo adjustment to a client device of a participant in the group chat.

In one or more embodiments, a system includes a processor configured to initiate executable operations. The executable operations include determining a topic and emotive content from a plurality of chat messages of a group chat, determining time deltas between different ones of the plurality of chat messages, determining a tempo and a tempo adjustment for the group chat based on the topic, the emotive content, and the time deltas, and indicating the tempo adjustment to a client device of a participant in the group chat.

In one or more embodiments, a computer program product includes a computer readable storage medium having program code stored thereon. The program code is executable by a processor to initiate executable operations. The executable operations include determining a topic and emotive content from a plurality of chat messages of a group chat, determining time deltas between different ones of the plurality of chat messages, determining a tempo and a tempo adjustment for the group chat based on the topic, the emotive content, and the time deltas, and indicating the tempo adjustment to a client device of a participant in the group chat.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
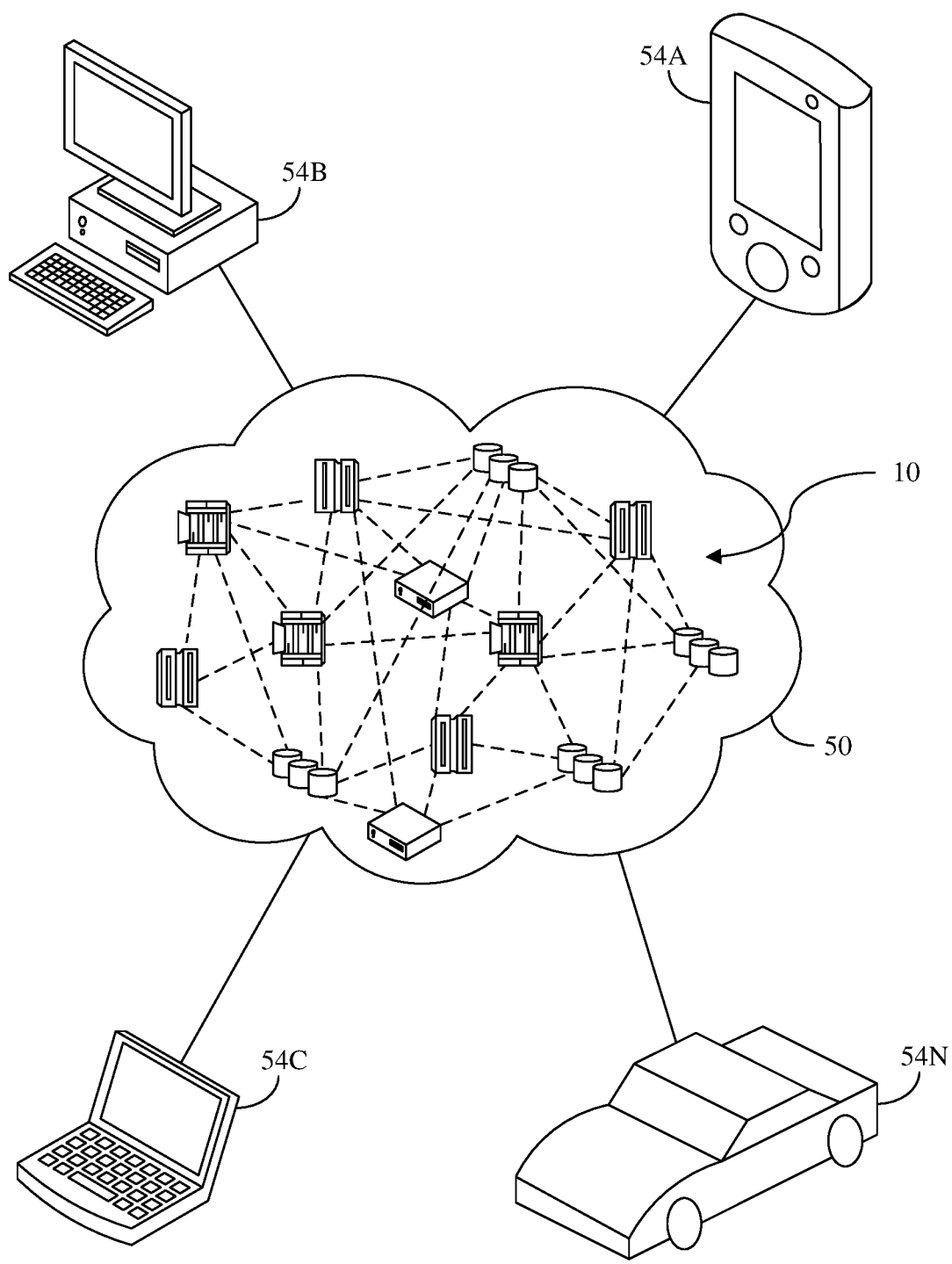
FIG. 1 depicts a cloud computing environment according to an embodiment of the present invention.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to chat technology and, more particularly, to regulating the velocity of chat discourse in a group chat. Group chat applications have become an important means of communication both socially and in the workplace. A significant amount of discussion and/or decision making occurs within real time group chat applications. Communicating through a group chat application, however, is not equivalent to face-to-face conversations, communicating over a telephone, and/or communicating via a video conferencing system. When communicating using a group chat application, cues that people would be able to easily sense in face-to-face conversation, when participating in a teleconference, and/or when participating in a video conference are not easily determined from the group chat dialogue. This often makes it difficult for participants in a group chat to infer or otherwise detect the appropriate tempo of the dialog taking place in the group chat from the chat messages alone.

As an illustrative and nonlimiting example, consider a group of users (e.g., employees) performing a Strengths, Weaknesses, Opportunities, Threats (SWOT) analysis. The users are engaging in the SWOT analysis to determine the cause of a critical issue. If conducted face-to-face, using a teleconferencing system, and/or using a video conferencing system, users would be able to determine when burst responses (e.g., rapid fire responses) to questions are needed or would be helpful. The need for rapid fire responses from the participants may not be apparent, however, when the conversation takes place via group chat. As another illustrative and nonlimiting example, consider a group of users having a heated conversation. If conducted face-to-face, using a teleconferencing system, and/or using a video conferencing system, the users would be able to determine that the conversation is becoming overly animated and that the situation calls for more time for reflection and/or more measured responses. The heated nature of the dialogue, however, may not be apparent to participants when communicating via group chat.

In accordance with the inventive arrangements disclosed within this specification, a system is capable of analyzing a group chat to determine the tempo or pace of the conversation taking place therein. The system is capable of analyzing the chat messages of the group chat to determine information such as, for example, one or more topics, emotive content, and/or time deltas between chat messages in the group chat. In particular embodiments, the system is also capable of determining a tone from the chat messages in the group chat. The system is capable of using the topic(s), the emotive content, optionally the tone, and the time deltas to determine a tempo of the discourse taking place in the group chat. The system is also capable of determining a suggested tempo adjustment for the discourse. The tempo adjustment may specify that no change in tempo of the discourse is needed or that a change in tempo of the discourse is needed. The tempo adjustment, for example, is capable of indicating that an increase in tempo is needed or that a decrease in tempo is needed. The tempo adjustment may also indicate a magnitude of the change in tempo that is needed.

In one or more embodiments, the system is capable of providing chat velocity information (e.g., tempo and/or tempo adjustment) to one or more client devices of participants in the group chat. The tempo adjustment, as interpreted and rendered by the client device, may indicate to the respective group chat participants whether the tempo of the conversation taking place in the group chat should increase, decrease, or remain unchanged. As discussed, tempo adjustment, as interpreted and rendered by the client devices, further may indicate a magnitude of the tempo adjustment suggested.

In one or more other embodiments, the system is capable of automatically regulating tempo of the discourse taking place within the group chat. For example, the system is capable of implementing one or more remediation methods that control the tempo of discourse taking place in the group chat. The remediation methods may include delaying delivery of one or more chat messages sent within the group chat in response to determining that the tempo of the group chat should be decreased. The remediation methods may include automatically generating one or more chat messages that can be provided to one or more or all of the participants in the group chat to prompt the participant or participants to respond to one another in a timelier manner, e.g., to increase the tempo of the conversation taking place in the group chat.

As defined herein, the term "group chat" means a chat session between two or more users. Users in the group chat are also referred to as "participants". Chat messages are exchanged in a group chat in real time and/or in near real time. Further, participants in a group chat are typically invited to participate in the group chat as opposed to an open public forum where users are able to join and/or post messages without restriction or invitation. Within this disclosure, the term "chat message" refers to an electronic message that is exchanged among client devices of participants in a group chat and/or between a chat server and one or more of the client devices of participants in the group chat.

As defined herein, the term "tempo", as applied to a group chat, means the rate or the speed at which chat messages are exchanged between two or more than two participants in a group chat. As such, the tempo of a group chat may change over time as chat messages are exchanged between participants. As defined herein, the term "emotive content" means the emotional connotation of one or more chat messages of a group chat. Emotive content can be determined for a portion of text corresponding to individual words, phrases, chat messages, or for a plurality of chat messages. Accordingly, the emotive content of a group chat may change over time as chat messages are exchanged between the participants. In one or more embodiments, the system is capable of detecting emotive content of one or more chat messages as positive or negative sentiment. As defined herein, the term "topic" means a subject of a portion of text such as a chat message or a plurality of chat messages. As defined herein, the term "tone" means the general character or attitude of a portion of text such as one or more chat messages. The "tone" of a portion of text, e.g., one or more chat messages, may be characterized as exhibiting anger, disgust, fear, joy, sadness, and/or any combination thereof.

Further aspects of the embodiments described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
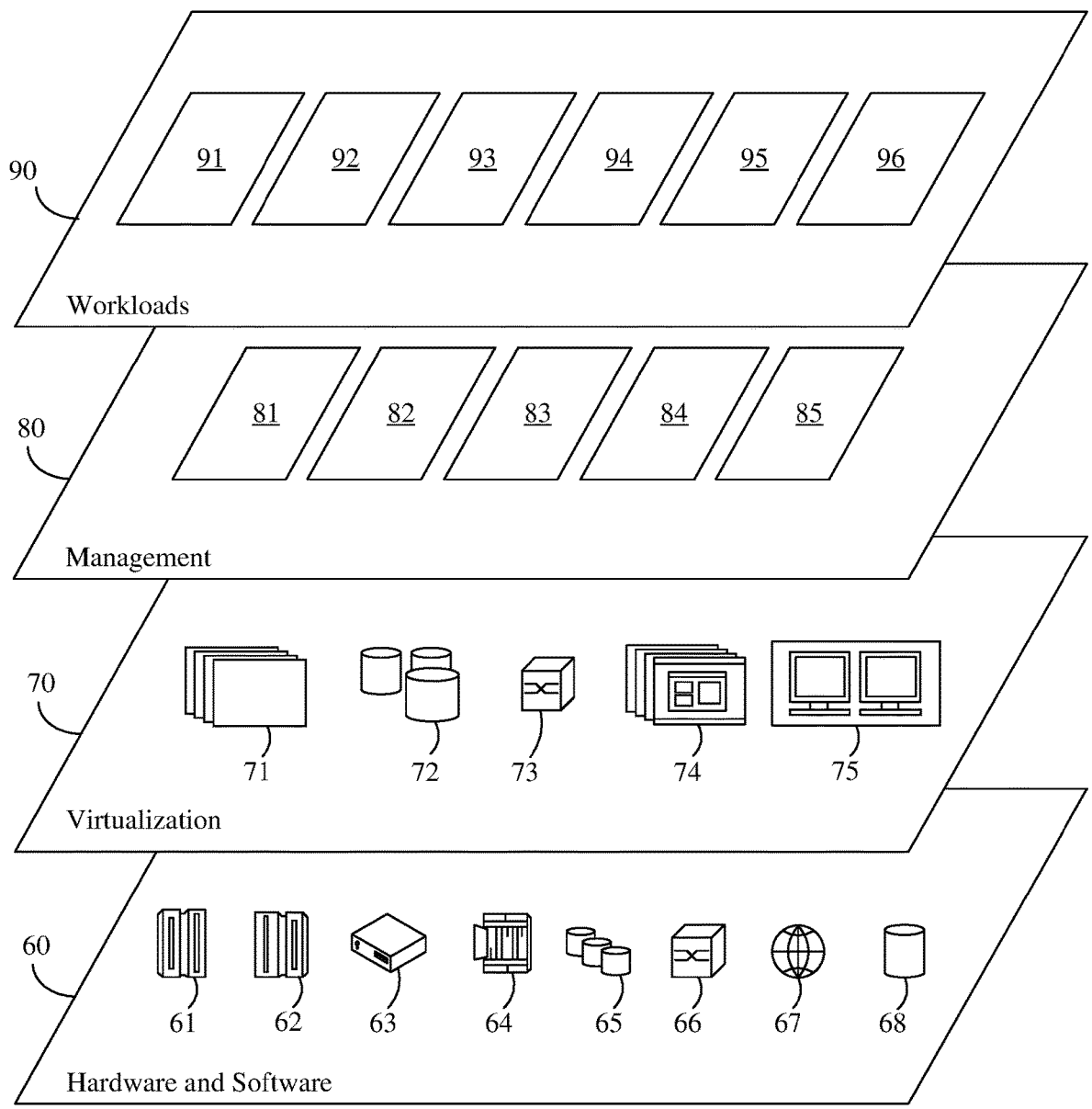
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and group chat velocity system (system) 96.

In one or more embodiments, system 96 is capable of analyzing chat messages of a group chat. System 96 is capable of analyzing the chat messages of the group chat to determine information such as, for example, one or more topics, emotive content, tone, and timing information. System 96 is capable of determining one or more or any combination of the foregoing parameters. System 96 is further capable of determining a tempo of the conversation taking place in the group chat based on the timing information of chat messages exchanged in the group chat. In particular embodiments, the timing information specifies time deltas between different ones of the chat messages.

System 96 is capable of determining whether the tempo of the conversation in the group chat, given the topic(s), emotive content, and/or optionally tone, should be adjusted. For example, system 96 is capable of generating a tempo adjustment, which specifies whether the tempo of the conversation taking place in the group chat should be increased, decreased, or remain unchanged. In this regard, tempo adjustment specifies a direction or no change. Further, the tempo adjustment may specify a magnitude of the suggested change (e.g., an amount of increase or decrease in tempo). System 96 is capable of performing the operations described to monitor the group chat and indicate tempo and/or tempo adjustment periodically, from time-to-time, and/or continually. In particular embodiments, system 96 is capable of performing the operations described in real time and/or near real time to continually determine tempos and tempo adjustments for the group chat over time.

By determining chat velocity information, e.g., the tempo and/or the tempo adjustment, for a group chat, system 96 is able to control and/or regulate the velocity of the discourse taking place in the group chat. System 96, for example, can provide suggestions to increase or decrease the tempo of discourse in the group chat and/or perform operations to slow down the tempo of the group chat and/or increase the tempo of the group chat based on the determined tempo adjustment. In this manner, system 96 is able to better engage participants in the group chat and facilitate more meaningful conversation. As an illustrative and nonlimiting example, system 96 is able to increase the speed of a group chat that is proceeding too slowly thereby maintaining the participant's attention in the group chat by prompting the participants to respond to one another and/or respond to open questions posed within the group chat. In another example, system 96 is able to slow the speed of a group chat that is proceeding too rapidly thereby eliciting more thoughtful responses from the participants and allowing the participants time to calm down before sending a potentially emotional and/or insulting chat message.

Figure 3:
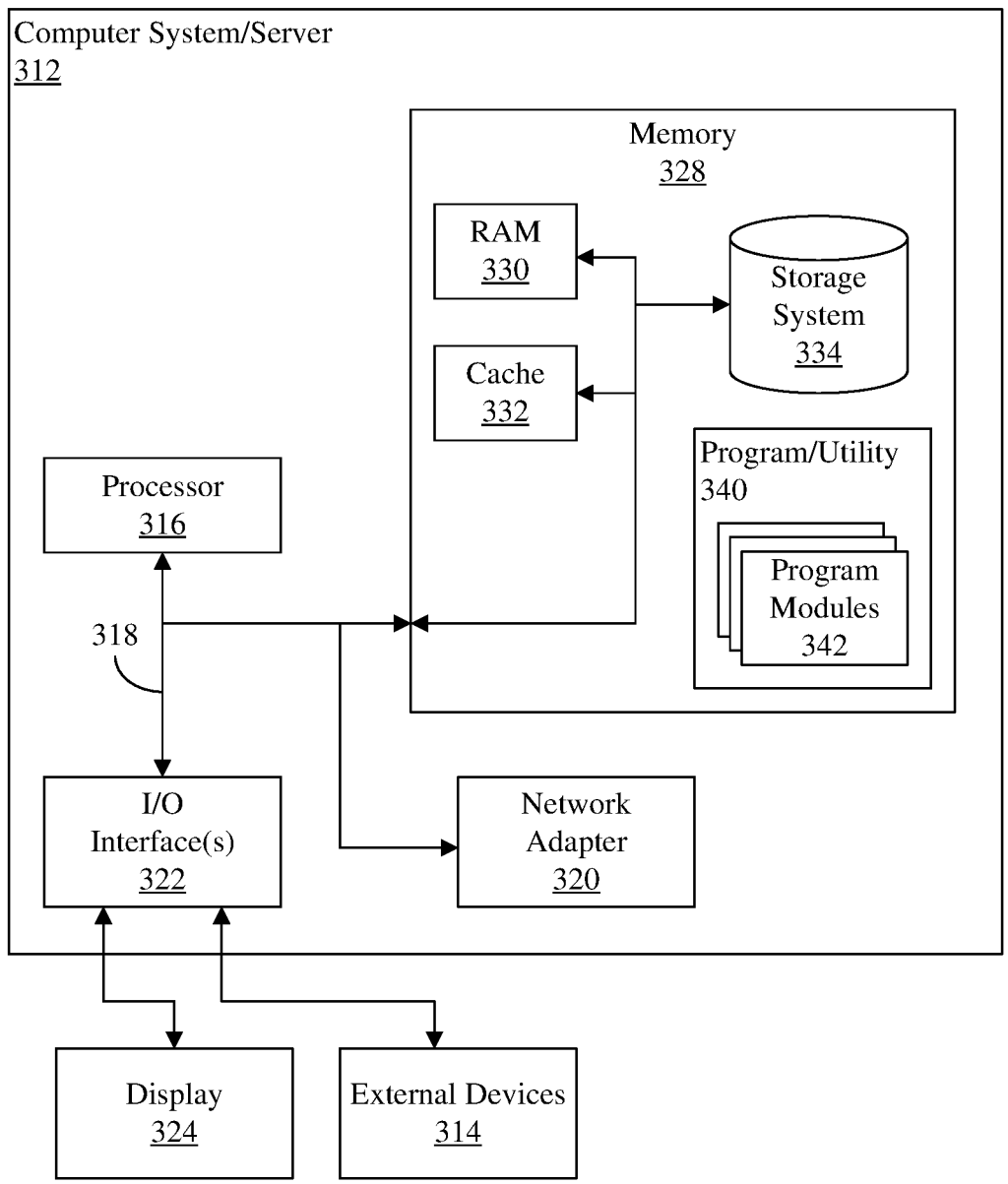
FIG. 3 depicts a cloud computing node according to an embodiment of the present invention.

FIG. 3 illustrates a schematic of an example cloud computing node. Cloud computing node 300 is only one example of a suitable cloud computing node and is not intended to suggest any limitation as to the scope of use or functionality of embodiments of the invention described herein. Regardless, cloud computing node 300 is capable of being implemented and/or performing any of the functionality set forth hereinabove.

Cloud computing node 300 includes a computer system/server 312, which is operational with numerous other general purpose or special purpose computing system environments or configurations. Examples of well-known computing systems, environments, and/or configurations that may be suitable for use with computer system/server 312 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 312 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 312 in cloud computing node 300 is shown in the form of a general-purpose computing device. The components of computer system/server 312 may include, but are not limited to, one or more processors 316, a memory 328, and a bus 318 that couples various system components including memory 328 to processor 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI express (PCIe) bus.

Computer system/server 312 typically includes a variety of computer system readable media. Such media may be any available media that is accessible by computer system/server 312. For example, such media may include volatile media, non-volatile media, removable media, non-removable media, or any combination thereof.

Memory 328 can include computer system readable media in the form of volatile memory, such as random access memory (RAM) 330 and/or cache memory 332. Computer system/server 312 may further include other removable/non-removable, volatile/non-volatile computer system storage media. By way of example, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided.

In such instances, each can be connected to bus 318 by one or more data media interfaces. As will be further depicted and described below, memory 328 may include at least one program product having a set (e.g., at least one) of program modules that are configured to carry out the functions of embodiments of the invention.

Program/utility 340, having a set (at least one) of program modules 342, may be stored in memory 328. By way of example, and not limitation, memory 328 can also store an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the invention as described herein.

For example, one or more of the program modules may implement system 96 or portions thereof. Program/utility 340 is executable by processor 316. Program/utility 340 and any data items used, generated, and/or operated upon by node 300 are functional data structures that impart functionality when employed by node 300. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer system/server 312 may also communicate with one or more external devices 314 such as a keyboard, a pointing device, a display 324, etc.; one or more devices that enable a user to interact with computer system/server 312; and/or any devices (e.g., network card, modem, etc.) that enable computer system/server 312 to communicate with one or more other computing devices. Such communication can occur via Input/Output (I/O) interfaces 322. Still yet, computer system/server 312 can communicate with one or more networks such as a local area network (LAN), a general wide area network (WAN), and/or a public network (e.g., the Internet) via network adapter 320. As depicted, network adapter 320 communicates with the other components of computer system/server 312 via bus 318. It should be understood that although not shown, other hardware and/or software components could be used in conjunction with computer system/server 312. Examples, include, but are not limited to: microcode, device drivers, redundant processing units, external disk drive arrays, RAID systems, tape drives, and data archival storage systems, etc.

While node 300 is used to illustrate an example of a cloud computing node, it should be appreciated that a computer system using an architecture the same as or similar to that shown in FIG. 3 may be used in a non-cloud computing implementation to perform the various operations described herein. In this regard, the example embodiments described herein are not intended to be limited to a cloud computing environment.

Node 300 is also an example of a server. As defined herein, the term "server" means a data processing system configured to share services with one or more other data processing systems. For example, the server may be an electronic messaging or chat server configured to share services with one or more client devices. As defined herein, the term "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein.

Figure 4:
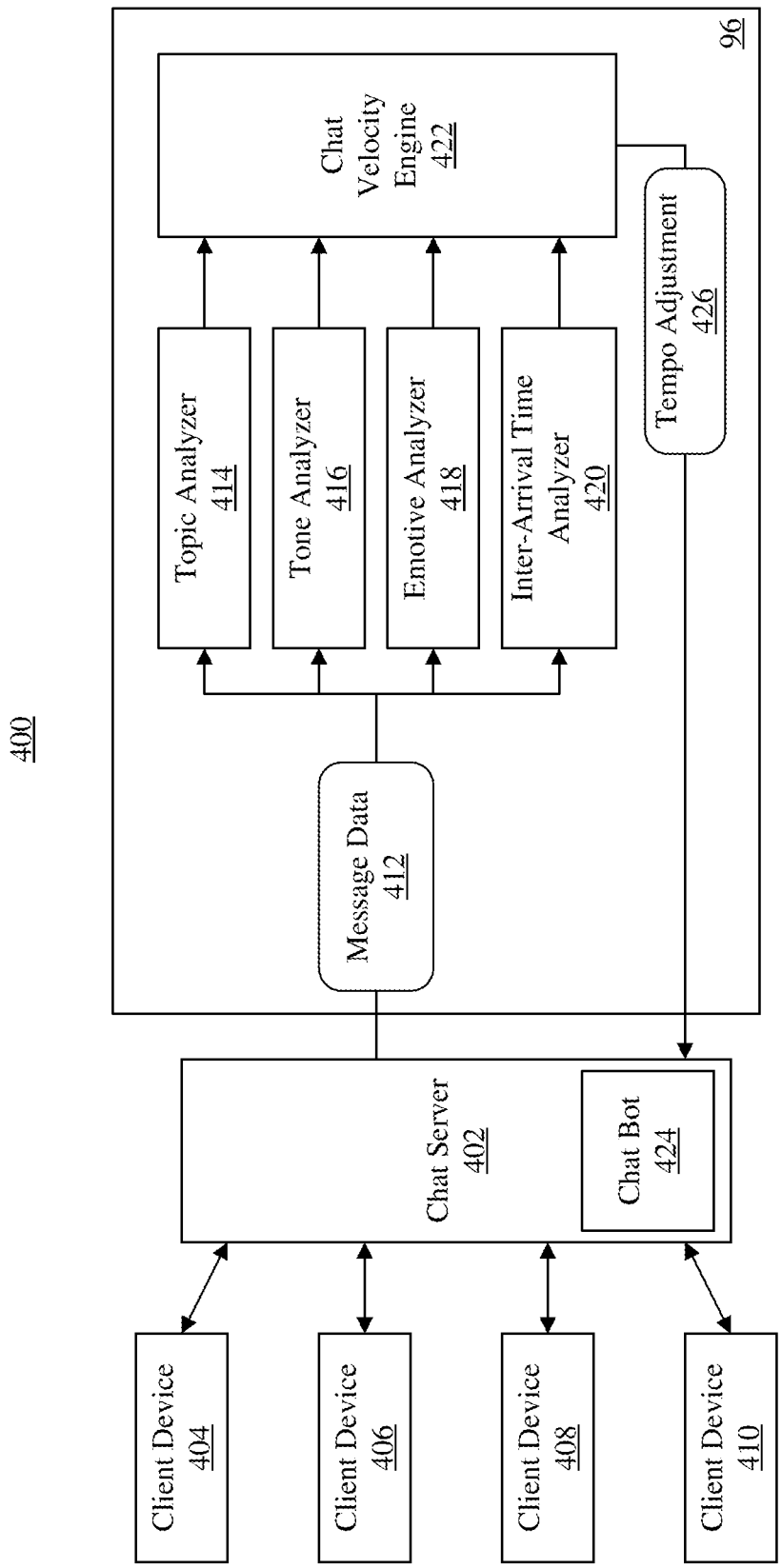
FIG. 4 illustrates an architecture for regulating velocity of chat discourse according to an embodiment of the present invention.

FIG. 4 illustrates an example architecture 400 for regulating chat discourse according to an embodiment of the present invention. Architecture 400 can be implemented within a computing environment the same as or similar to the computing environment described with reference to FIGS. 1 and/or 2 and further can be implemented within a computing system the same as or similar to the computing system described with reference to FIG. 3. In the example of FIG. 4, architecture 400 includes a chat server 402 and an example implementation of system 96. As pictured, chat server 402 is communicatively linked with system 96. In one or more embodiments, chat server 402 is implemented in one or more data processing systems, while system 96 is implemented in one or more other data processing systems. In one or more other embodiments, though not illustrated in FIG. 4, system 96 is implemented within chat server 402.

In the example of FIG. 4, chat server 402 is communicatively linked to client devices 404, 406, 408, and 410. For purposes of illustration, client devices 404-410 are participating in a group chat conducted by chat server 402. It should be appreciated that a group chat may include fewer or more participants than illustrated in FIG. 4. In one or more embodiments, chat server 402 is capable of sharing message data 412 with system 96. Message data 412 may include the chat messages exchanged among client devices 404-410, the time that each chat message was sent, and other metadata such as the identity of the sender of each respective chat message.

In one or more embodiments, message data 412 is implemented with a JSON message structure. An example of a JSON message structure that may be used to implement message data 412 is shown below as Example 1.

Example 1

```
In [ ]: [
{
  "_id": "56e0462f9932d8c08d4de999",
  "content": "Hello, font is of different color in FF (black) and Chrome (greyish)",
  "contentType": "text/html",
  "authorId": "72353640-8f4a-102b-8b12-99c200cfc5b7",
  "deviceId": "965435e0-e60e-11e5-86d6-c91fc4b59bc6",
  "requestId": "1457538612805",
  "chatRoomId": "56e046219932d8c08d4de998",
  "hidden": false,
  "published": "1457538607647",
```

```
    "updated": "1457538607647",
    "publishedBy": "72353640-8f4a-102b-8b12-99c200cfc5b7",
    "updatedBy": "72353640-8f4a-102b-8b12-99c200cfc5b7",
    "topic_terms": ["hello", "font", "color", "ff", "chrome"]
    "version": "0"
  },
]
```

In general, system 96 is capable of performing Natural Language Processing (NLP) on message data 412 and/or a content portion (e.g., the body portion of chat messages) of message data 412. NLP is a field of computer science, artificial intelligence and computational linguistics which implements computer processes to facilitate interactions between computer systems and human (natural) languages. NLP enables computers to derive computer-understandable meaning from natural language input. The International Organization for Standardization (ISO) publishes standards for NLP, one such standard being ISO/TC37/SC4. As part of NLP, semantic analysis may be performed. Semantic analysis may follow parsing and involve extraction of context-independent aspects of a sentence's meaning, including entities, named entities, the semantic roles of entities mentioned in the sentence, and quantification information, such as cardinality, iteration, sentiment, tone, and dependency.

In the example of FIG. 4, system 96 includes a topic analyzer 414, optionally a tone analyzer 416, an emotive analyzer 418, and an inter-arrival time analyzer (IATA) 420. In general, topic analyzer 414, tone analyzer 416, and emotive analyzer 418 are capable of performing different aspects of NLP. Topic analyzer 414 is capable of processing portions of text, e.g., message data 412, to determine one or more topics from the chat messages contained therein. Topic analyzer 414, for example, may be trained to detect and extract topics from the body portion of chat messages. As an illustrative and nonlimiting example, topic analyzer 414 may be implemented as a latent Dirichlet allocation (LDA) type of generative statistical model. Topic analyzer 414, for example, is capable of determining that chat messages contain a mixture of a small number of topics and that the presence of particular words within the chat messages are attributable to particular ones of the topics. For each topic that is output, topic analyzer 414 may also provide a score indicating relevance of the topic to the analyzed text.

Tone analyzer 416 is capable of performing linguistic analysis of message data 412 to detect emotional and language tones in chat messages of the group chat. Tone analyzer 416 is capable of analyzing tone at various levels of granularity, e.g., a chat message level, a sentence level, etc. An example of tone analyzer 416 is the IBM Watson™ Tone Analyzer service available from IBM Corporation of Armonk, N.Y. Tone analyzer 418 is capable of determining, for example, whether one or more chat messages indicate anger, disgust, fear, joy, and/or sadness. For a given portion of text (e.g., chat message or chat messages), tone analyzer 418 is capable of outputting each/any of the five emotions detected within the text and a score for each. The score is typically between 0 and 1 and indicates the confidence of detected emotions. In particular embodiments, the score may be used to indicate a degree or magnitude of each respective emotion detected within the text. As an illustrative and nonlimiting example, for a given portion of a group chat, tone analyzer 416 may generate an output indicating: joy (0.47), anger (0.14), disgust (0.13), sadness (0.50), and fear (0.09).

Tone analyzer 418 is also capable of classifying text as being analytical, technical, or confident. Tone analyzer 418 is capable of generating an additional output between 0 and 1, for example, that indicates the classification of the text being analyzed. As an illustrative and nonlimiting example, tone analyzer 418 is capable of classifying text as analytical, technical, or confident based on a score where a score less than 0.5 indicates analytical, a score of 0.5 to 0.75 indicates technical, and a score above 0.75 indicates confident. It should be appreciated that the values provided are for purposes of illustration and not limitation. Other ranges may be defined to classify text as analytical, technical, or confident than those listed.

Emotive analyzer 418 is capable of analyzing message data 412 to determine the sentiment being expressed. The sentiment may be negative or positive. In this regard, emotive analyzer 418 is capable of outputting an indication of sentiment such as positive or negative along with a score indicating the confidence of the sentiment determination. In particular embodiments, the score may be used to indicate degree of positivity or negativity as the case may be. The score is typically between 0 and 1. An example implementation of an emotive analyzer is the Watson Natural Language Understanding Service.

IATA 420 is capable of performing a timing analysis on message data 412. In one or more embodiments, IATA 420 is capable of determining the send time of each chat message in the group chat. In addition, IATA 420 is capable of determining the time delta, or differential, between send times of different ones of the chat messages. The time delta between chat messages is also referred to herein as the inter-arrival time of chat messages. In particular embodiments, IATA 420 is capable of determining the time delta between send times of consecutive chat messages (in time). For example, as the time delta between consecutive chat messages in the group chat decreases, the tempo of the discourse taking place in the group chat increases. As the time delta between consecutive chat messages in the group chat increases, the tempo of the discourse taking place in the group chat decreases. In general, tempo of the discourse in a group chat may be determined as the inverse or reciprocal of the time delta(s). While IATA 420 is capable of calculating the time delta between individual chat message pairs, it should be appreciated that IATA 420 is also capable of applying a smoothing or averaging to the time deltas to more accurately determine tempo of the group chat. In this regard, IATA 420 is capable of providing an output that indicates or specifies tempo of the group chat over time.

In one or more other embodiments, IATA 420 is capable of generating user-specific timing data. For example, IATA 420 is also capable of generating a tempo of chat discourse as applied to a particular participant in the group chat or for particular participants (e.g., a subset of participants) in the group chat. In that case, the tempo can be determined based on the send times of chat messages from the selected participant or of chat messages from the selected subset of participants in the group chat. Participant-specific tempo may be used to provide user-specific feedback and tempo adjustments as opposed to tempo adjustments for the group chat as a whole or that are generalized across participants.

In one or more embodiments, IATA 420 may be implemented using the SciPy software toolkit. SciPy is a Python-based ecosystem of open-source software for mathematics, science, and engineering. It should be appreciated that SciPy is provided for purposes of illustration and is not intended as a limitation of the embodiments described herein. Other software packages may be used in addition to, or in place of, SciPy.

System 96 also includes a chat velocity engine 422. Chat velocity engine 422 receives the outputs generated by topic analyzer 414 (e.g., one or more topics), tone analyzer 416 (e.g., one or more emotions), emotive analyzer 418 (e.g., sentiment), and IATA 420 (e.g., a tempo of the chat conversation and/or other timing data such as time delta(s)). Chat velocity engine 422 further may receive the respective scores for the outputs generated by topic analyzer 414, tone analyzer 416, and emotive analyzer 418. Chat velocity engine 422 may be implemented as a neural network. The term "neural network," as used within this disclosure, means a programmatic description or definition of a neural network. The neural network programmatically defines parameters, connection weights, or other specifics of the architecture such as the number of neurons contained therein or the connectivity among the neurons. In one aspect, a neural network is specified using computer readable program instructions, e.g., as program code and data, stored in a computer readable storage medium. The neural network can be organized in a number of layers, where the output of a first layer can be fed as input to the next layer.

In particular embodiments, chat velocity engine 422 is implemented as a recurrent neural network (RNN). An RNN is a class of neural network where connections between nodes of the neural network form a directed graph along a sequence. An RNN exhibits temporal dynamic behavior for a time sequence (e.g., chat messages of message data 412) and the outputs from topic analyzer 414, tone analyzer 416, emotive analyzer 418, and IATA 420.

Chat velocity engine 422 may be trained to a point where the weights of the neural network have converged or substantially converged to generate a tempo adjustment 426. In particular, a training process has determined a set of weights for the nodes that provides the neural network with the desired input-output relationship to generate tempo adjustment values over time based on the inputs provided to chat velocity engine 422. To this end, a learning process may be used to adjust the weights of the neural network to change the input-output relationship so that an input-output accuracy cost function is optimized. Thus, the goal of a training process is to change the input-output relationship of chat velocity engine 422.

In the example of FIG. 4, the training of chat velocity engine 422 may be performed so that given tempo of discourse in a group chat, one or more topics discussed in the group chat, optionally tone of the group chat (e.g., at a given time), and emotive content of the group chat (e.g., at the given time), chat velocity engine 422 is capable of outputting tempo adjustment 426 indicating whether the tempo of the discourse in the group chat should be increased, decreased, or remain unchanged. Further, tempo adjustment 426 can indicate a degree or magnitude of the decrease or increase as the case may be. For example, the magnitude can be expressed as a value between 0 and 1. It should be appreciated that chat velocity engine 422 is capable of outputting tempo adjustment 426 from time-to-time, periodically, or on a continuing basis (e.g., in real time and/or in near real time).

In the example of FIG. 4, chat velocity engine 422 is capable of providing chat velocity information as output to chat server 402. In one or more embodiments, chat server 402 is capable of providing tempo adjustment 426 to client devices 404-410 during, or as part of, the group chat. The chat client application executing in client devices 404-410 is capable of interpreting tempo adjustment 426 and rendering an indication of tempo adjustment 426 in each of client devices 404-410 within the group chat. In particular embodiments, the indication of tempo adjustment 426 is an overlay providing guidance on how to adjust the tempo of discourse in the group chat.

In one or more other embodiments, chat velocity engine 422 is capable of providing chat velocity information directly to one or more of client devices 404-410. Accordingly, the chat client application executing in the client devices 404-410 is capable of rendering indication(s) of tempo adjustment 426.

In one or more other embodiments, chat server 402 is capable of regulating or controlling the tempo of discourse in the group chat in response to the chat velocity information generated by chat velocity engine 422. Chat server 402 is capable of using tempo adjustment 426 to regulate the tempo of discourse in the group chat. In one example, chat server 402 is capable of delaying the delivery of one or more chat messages in the group chat in response to tempo adjustment 426 indicating that the tempo of the discourse is too fast and should be slowed. Chat server 402 may continue to delay chat messages while tempo adjustment 426 continues to indicate that the tempo of discourse should be decreased. In particular embodiments, the amount of the delay applied to the chat message(s) can vary directly with the magnitude of the suggested change in tempo (e.g., the magnitude of tempo adjustment 426).

In another example, chat server 402 is capable of using a chat bot (e.g., a chat robot) 424 to automatically generate and send chat messages, e.g., prompts, to participants to increase the tempo of discourse in the group chat in response to tempo adjustment 426 indicating that the tempo of the discourse is too slow and should be increased. Chat bot 424, for example, is capable of automatically generating bridging discourse based on prior content of the group chat.

In one or more embodiments, chat velocity engine 422 is capable of outputting information in addition to tempo adjustment 426 as part of the chat velocity data. For example, chat velocity engine 422 is capable of outputting the tempo, topic(s), tone(s), emotive content, timing information, or any combination thereof with tempo adjustment 426. In any case, in particular embodiments, information output from chat velocity engine 422 can be stored as part of the dialog or chat history of the group chat within chat server 402 or in another data storage device. This allows the state of the group chat to be preserved, whether the state includes only tempo adjustment 426 or tempo adjustment 426 and any combination of the other data items generated by system 96, for any point within the group chat without having to recompute the data from the start of the discourse.

In some cases, system 96 may generate a statistically ambiguous result where the tempo recommendation, e.g., the tempo adjustment, for discourse is unclear. For example, chat velocity engine 422 may also generate a score indicating a degree of certainty in the result that is generated for the tempo adjustment. In one or more embodiments, in cases where the score does not exceed a threshold value, system 96 is capable of querying or prompting a participant whether to apply the tempo recommendation that has been determined. In that case, system 96 applies the tempo adjustment only in response to receiving an input from the queried participant(s) indicating to apply the tempo adjustment. For example, system 96 is capable of instructing chat server 402 to query one or more of the participants of the group chat whether to apply a tempo adjustment. The querying or prompting may be performed by chat bot 424 within the group chat or through a communication channel external to the group chat (e.g., text message to a mobile device outside of the group chat, via electronic mail, via a phone call, etc.).

Figure 5:
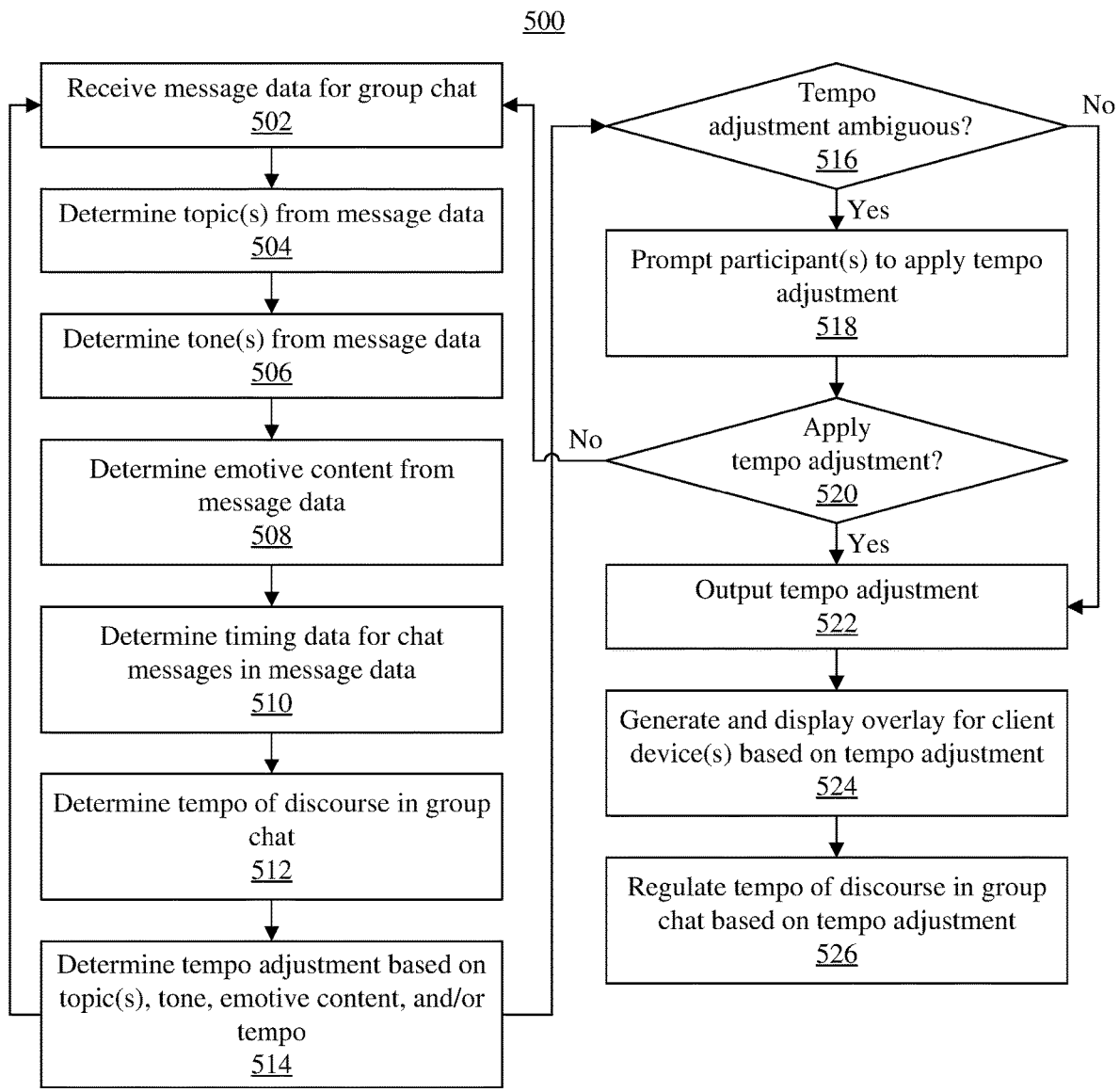
FIG. 5 illustrates a method of regulating chat discourse according to an embodiment of the present invention.

FIG. 5 illustrates a method 500 of regulating chat discourse according to an embodiment of the present invention. Method 500 can be implemented by a system the same as or similar to the system described herein with reference to FIGS. 1-4.

In block 502, the system receives message data for a group chat. In block 504, the system determines one or more topics from the message data. As discussed, the system is capable of analyzing content of chat messages to determine one or more topics being discussed in the group chat. The system may further generate scores for each topic. In block 506, the system is capable of optionally determining one or more one or more emotions such as anger, disgust, fear, joy, and/or sadness from chat messages contained in the message. The system may further generate scores for each emotion and/or each emotion detected in the text. The system is further capable of classifying the chat messages as analytical, technical, or confident.

In block 508, the system is capable of determining emotive content from the message data. As discussed, the system is capable of determining sentiment from chat messages contained in the message data. The system may further generate a scores for the sentiment. In block 510, the system is capable of determining timing data for chat messages in the message data. The timing data may include inter-arrival times which specify time deltas between different ones of the chat messages. For example, the system is capable of determining inter-arrival time between chat message postings. As discussed, the inter-arrival times may be determined for pairs of consecutive chat messages (e.g., consecutive pairs of chat messages in time for the group chat as a whole), for consecutive messages from a particular participant in the group chat, or between consecutive chat messages from selected participants in the group chat.

In block 512, the system is capable of determining a tempo for discourse taking place in the group chat. In one or more embodiments, the system is capable of determining tempo as a log, a square-root, or a reciprocal transformation of the inter-arrival time (e.g., time delta). The system is capable of calculating a running tempo, which may also be calculated as a running average. It should be appreciated that the particular examples provided for determining tempo based on inter-arrival time(s) are for purposes of illustration and not limitation. Other techniques and/or transforms may be used to represent tempo from the timing data for chat messages.

In block 514, the system is capable of determining a tempo adjustment for the discourse taking place in the group chat based on one or more topics, optionally one or more tones, emotive content, and/or the timing data (e.g., tempo) determined in blocks 504, 506, 508, 510, and/or 512. In one or more embodiments, the system is capable of processing the data generated in block 504-512 through a chat velocity engine implemented as a trained RNN.

The example of FIG. 5 is intended to illustrate real-time and/or near real time processing of chat messages within the group chat. In this regard, method 500 may loop back to block 502 to continue processing further chat messages exchanged in the group chat. In addition, method 500 may continue to block 516.

In block 516, the system determines whether the tempo adjustment determined in block 514 is ambiguous. For example, the system is capable of comparing a score of the tempo adjustment with a threshold value. In response to determining that the tempo adjustment is ambiguous (e.g., that the score does not exceed the threshold value), method 500 continues to block 518. In response to determining that the tempo adjustment is not ambiguous (e.g., that the confidence score does exceed the threshold value), method 500 continues to block 522.

In block 518, the system prompts one or more of the participants whether to apply the tempo adjustment to the group chat. As discussed, the system is capable of instructing the chat server to prompt the participants for a response. In one or more other embodiments, the system is capable of interfacing with other communication systems to query the participant(s) outside of the group chat. In block 520, the system determines whether to apply the tempo adjustment to the group chat based on the received response(s) from the participant(s). In response to determining that the tempo adjustment is not to be applied, based on the received response(s), method 500 loops back to block 502 to continue processing further chat messages. In response to determining that the tempo adjustment is to be applied to the group chat, method 500 continues to block 522.

In block 522, the system is capable of outputting the tempo adjustment. As discussed, the tempo adjustment may be output to the chat server and or distributed to client devices of participants of the group chat.

In block 524, the system is capable of generating and displaying an overlay for client devices of the participants. The overlay is generated based on the tempo adjustment. In one or more embodiments, the chat server is capable of sending the tempo adjustment to client devices of the participants. In other embodiments, the chat velocity engine sends the tempo adjustment to the client devices of the participants. In any case, the chat client application executed by the respective client devices is capable of interpreting the tempo adjustment and rendering an indication of the tempo adjustment that is displayed within the chat client application of the client devices. The overlay, or indicators of tempo adjustment, convey instructions to the participants to speed up discourse, slow down discourse, or leave discourse unchanged within the group chat.

While tempo adjustments can be provided to each client device of a participant, in another example, the chat server and/or chat velocity engine is capable of providing tempo adjustments to only particular client devices. In such cases, the tempo adjustments are specific to the participants of the client devices receiving the respective tempo adjustments.

In block 526, the system is capable of regulating the tempo of discourse taking place in the group chat based on the tempo adjustment generated in block 514. In cases where the tempo adjustment indicates that no change in tempo is required, the system allows discourse to continue within the group chat unaltered. In cases where the tempo adjustment indicates that the tempo is too slow and should be increased, the system is capable of automatically generating one or more chat messages that may be sent to participants of the group chat prompting the participants to respond or provide input to the discussion. In cases where the tempo adjustment indicates that the tempo is too fast and should be decreased, the system is capable of automatically delaying one or more chat messages sent from participants of the group chat.

Figure 6:
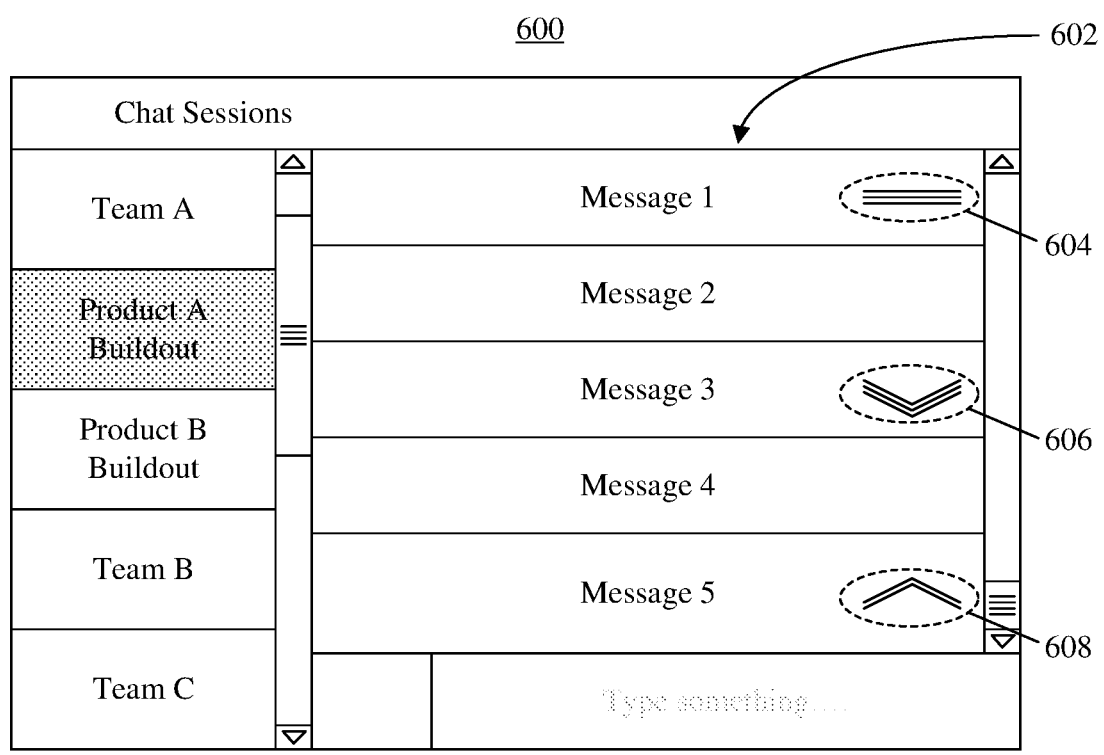
FIG. 6 illustrates a graphical user interface (GUI) for a chat client application according to an embodiment of the present invention.

FIG. 6 is a graphical user interface (GUI) 600 for a chat client application according to an embodiment of the present invention. GUI 600 may be generated by a chat client application executed by a client device of a participant in a group chat. GUI 600 may be used whether the chat client application is a browser-based application or a standalone or dedicated chat client application. In the example of FIG. 6, GUI 600 lists a plurality of group chats called "Team A", "Product A Buildout", "Product B Buildout", "Team B", and "Team C". For purposes of illustration, the group chat called "Product A Buildout" is selected. Accordingly, the chat messages displayed in region 602 belong to the "Product A Buildout" group chat. Region 602 shows chat messages labeled as messages 1, 2, 3, 4, and 5.

In the example of FIG. 6, the system has provided tempo adjustments to the client device executing the chat client application. Accordingly, the chat client application interprets the tempo adjustments and displays an indicator corresponding to each received tempo adjustment. As pictured, GUI 600 includes indicators 604, 606, and 608, which provide instructions or suggestions to the participant using the chat client application to regulate the tempo of discourse. For purposes of illustration, the indicators are shown as chevrons. Magnitude of the tempo adjustment is illustrated in terms of the number of chevrons shown or stacked. Further, color may be used to indicate magnitude.

In the example of FIG. 6, indicator 604 is formed of a plurality of horizontal lines indicating that no change in the tempo of the discourse is suggested. Indicator 606 includes three stacked chevrons pointing down indicating that the tempo of the discourse is too slow and should be increased. Indicator 608 includes two stacked chevrons pointing up indicating that the tempo of the discourse is too fast and should be decreased. The magnitude of the suggested increase in tempo indicated by indicator 606 (having 3 chevrons) is larger than the magnitude of the suggested decrease in tempo indicated by indicator 608 (having 2 chevrons).

GUI 600 illustrates that as different tempo adjustments are received by the client device over time, the chat client application is capable of rendering the indicators synchronized in time with the corresponding chat messages to which the tempo adjustments pertain or synchronized with the points in time in the discourse of the group chat to which the tempo adjustments pertain.

Figure 7:
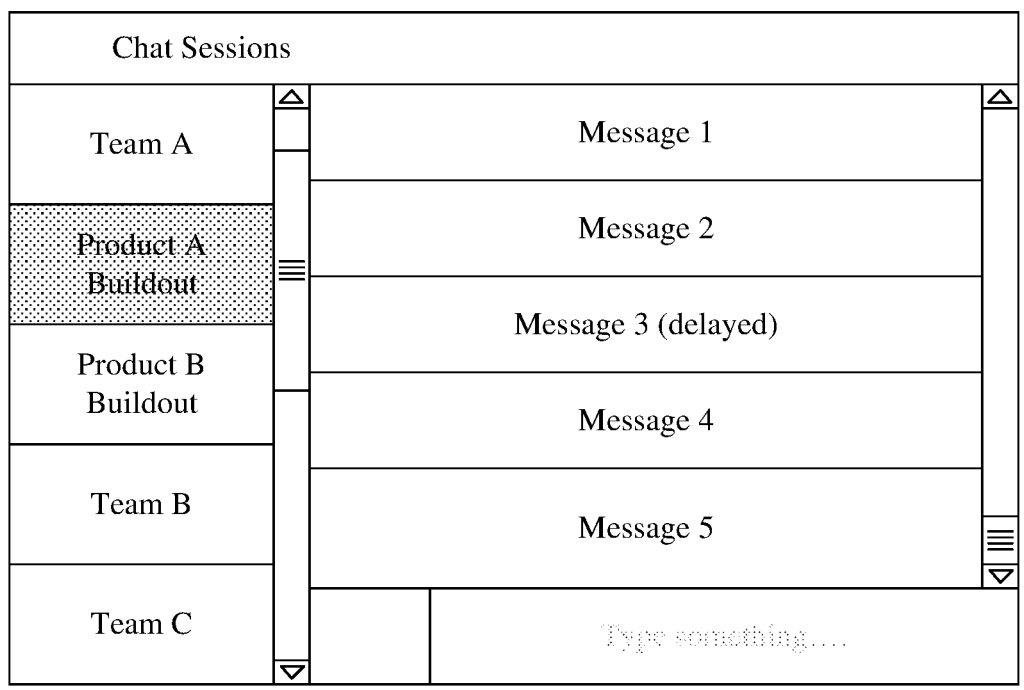
FIG. 7 illustrates a GUI for a chat client application according to another embodiment of the present invention.

FIG. 7 is a GUI 700 for a chat client application according to another embodiment of the present invention. GUI 700 may be generated by a chat client application executed by a client device of a participant in a group chat. In the example of FIG. 7, the system has determined that the tempo of discourse taking place in the "Product A Buildout" group chat is too fast. In response, the system has delayed message 3. For example, the system, in response to detecting that the tempo of discourse is too fast, receives message 3 from a participant and delays the posting or delivery of message 3 to the group chat. For example, the system may keep the message in a message queue for a predetermined amount of time prior to posting the message the group chat. In one or more embodiments, the amount of delay is based on the magnitude of the tempo adjustment. For example, in cases where the system determines a tempo adjustment indicating that a more significant slowdown in tempo is needed, the system delays the next chat message or next plurality of chat messages by a larger amount of time.

Figure 8:
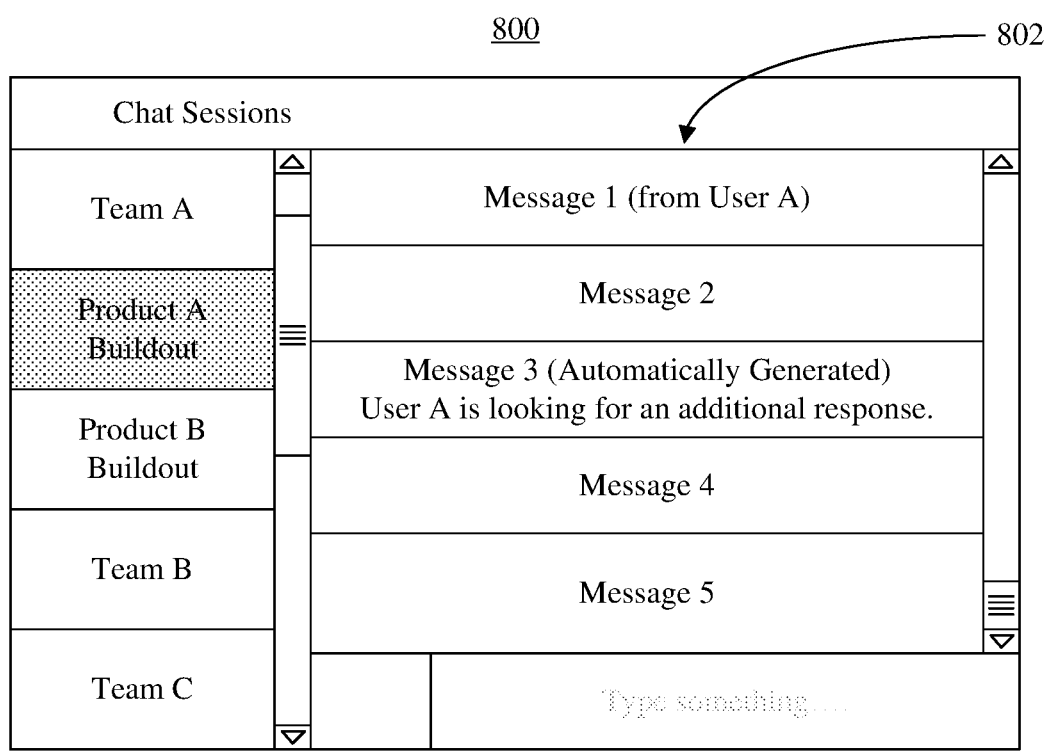
FIG. 8 illustrates a GUI for a chat client application according to another embodiment of the present invention.

FIG. 8 is a GUI 800 for a chat client application according to another embodiment of the present invention. GUI 800 may be generated by a chat client application executed by a client device of a participant in a group chat. In the example of GUI 800, the system has determined that the tempo of discourse taking place in the "Product A Buildout" group chat is too slow. In response, the system has automatically generated message 3 and delivered message 3 to the group chat. Message 3, for example, may be a prompt for the participants to participate more aggressively or provide feedback more quickly. In particular embodiments, the system is capable of detecting whether a given chat message from a participant asks a question that has not yet been answered. For example, the system is capable of determining that message 1 poses a question to the participants in the group chat. The system is also capable of determining that none of the participants have responded to message 1. In that case, the system automatically generates message 3 prompting the participants of the group chat to provide a response to message 1.

In particular embodiments, automatically generated messages from the system may be transient in nature. In the example of FIG. 8, the system is capable of displaying message 3 for a predetermined period of time. After expiration of the predetermined period of time, the system is capable of removing message 3 from region 802 of the group chat. Once removed, participants are unable to view message 3. The system removes message 3 from the discourse displayed in each participant's chat client application. In one or more other embodiments, the period of time before the auto generated chat message is removed can vary based on the magnitude of the tempo adjustment. For example, in cases where the tempo adjustment indicates that discourse in the group chat is too fast and the magnitude is 0.9, the system is capable of setting the period of time that the automatically generated chat message is displayed based on the magnitude. As another example, in cases where the tempo adjustment indicates that discourse in the group chat is too fast and the magnitude is 0.5, the system sets the period of time that the automatically generated chat message is displayed to a longer duration than for the 0.9 magnitude.

The example GUIs illustrated in FIGS. 6-8 provide improved user interfaces through which participants are able to communicate with one another. The example GUIs provide more intuitive message handling capabilities by providing suggestions that aid participants through improved quality of discourse. By improving the quality of discourse, the system chat message traffic on the system may be reduced thereby improving chat message performance. For example, with more effective communication, fewer chat messages may be exchanged thereby allowing the chat server to handle a greater number of group chats concurrently.

The types of feedback illustrated in FIGS. 6-8 are provided for purposes of illustration and not limitation. Other examples of feedback that may be provided to users to indicate tempo of discourse and/or a suggested change in tempo of discourse may include haptic feedback. In addition, the types of feedback shown may be provided uniformly across all client devices of participants in the group chat so that each participant sees the same indications of tempo adjustment. In one or more other embodiments, indications of tempo adjustments may be provided on a per user basis so that different participants may see different tempo adjustment indications. For example, participant A may see GUI 600 of FIG. 6 where the indicators correspond to the chat messages of participant A, while participant B may see other indicators corresponding to participant B's chat messages.

In one or more other embodiments, system 96 may be implemented within a client device as opposed to being implemented within a server. In that case, system 96 is capable of directly accessing the user's chat client application, for example, through an application programming interface thereof, to create the indications illustrated in FIGS. 6-8 and/or provide other types of feedback including haptic feedback.

The inventive arrangements described herein are capable of providing tempo recommendations for a group chat that may be converted into actions. The recommendations and/or actions may be based on the tone and/or emotive content of the group chat or on the tone and/or emotive content of a selected (e.g., one or more selected) participants of the group chat. The embodiments are capable of governing the tempo of the chat messages (e.g., responses) by interjecting speed governing events such as automatically generated chat messages and/or prompts and/or delaying one or more chat messages in the group chat.

The terminology used herein is for the purpose of describing particular embodiments only and is not intended to be limiting. Notwithstanding, several definitions that apply throughout this document now will be presented.

The term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," or similar language mean that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

As defined herein, the term "output" means storing in physical memory elements, e.g., devices, writing to display or other peripheral output device, sending or transmitting to another system, exporting, or the like.

As defined herein, the term "processor" means at least one hardware circuit configured to carry out instructions. The instructions may be contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

The term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   determining, using computer hardware, a topic and emotive content from a plurality of chat messages of a group chat;
   determining, using the computer hardware, time deltas between different ones of the plurality of chat messages;
   determining, using the computer hardware, a tempo and a tempo adjustment for the group chat based on the topic, the emotive content, and the time deltas; and
   indicating, using the computer hardware, the tempo adjustment to a client device of a participant in the group chat.

2. The method of claim 1, further comprising:
   automatically adjusting the tempo of the group chat based on the tempo adjustment.

3. The method of claim 2, wherein the automatically adjusting the tempo of the group chat comprises:
   delaying a selected chat message of the plurality of chat messages.

4. The method of claim 2, wherein the adjusting the tempo of the group chat comprises:
   providing an automatically generated chat message to the client device of the user participating in the group chat.

5. The method of claim 4, wherein the automatically generated chat message is transient within the group chat.

6. The method of claim 1, further comprising:
determining a tone of the plurality of chat messages;
wherein the tempo adjustment is also determined based on the tone.

7. The method of claim 1, wherein the indicating the tempo adjustment comprises:
displaying, within the client device of the user, a visual indicator of the tempo adjustment.

8. The method of claim 7, wherein the visual indicator specifies a magnitude of the tempo adjustment.

9. The method of claim 1, wherein the tempo adjustment is specific to the user participating in the group chat.

10. A system, comprising:
a processor configured to initiate executable operations including:
determining a topic and emotive content from a plurality of chat messages of a group chat;
determining time deltas between different ones of the plurality of chat messages;
determining a tempo and a tempo adjustment for the group chat based on the topic, the emotive content, and the time deltas; and
indicating the tempo adjustment to a client device of a participant in the group chat.

11. The system of claim 10, wherein the processor is configured to initiate executable operations further comprising:
automatically adjusting the tempo of the group chat based on the tempo adjustment.

12. The system of claim 11, wherein the automatically adjusting the tempo of the group chat comprises:
delaying a selected chat message of the plurality of chat messages.

13. The system of claim 11, wherein the adjusting the tempo of the group chat comprises:
providing an automatically generated chat message to the client device of the user participating in the group chat.

14. The system of claim 13, wherein the automatically generated chat message is transient within the group chat.

15. The system of claim 10, wherein the processor is configured to initiate executable operations further comprising:
determining a tone of the plurality of chat messages;
wherein the tempo adjustment is also determined based on the tone.

16. The system of claim 10, wherein the indicating the tempo adjustment comprises:
displaying, within the client device of the user, a visual indicator of the tempo adjustment.

17. The system of claim 16, wherein the visual indicator specifies a magnitude of the tempo adjustment.

18. The system of claim 10, wherein the tempo adjustment is specific to the user participating in the group chat.

19. A computer program product comprising a computer readable storage medium having program instructions embodied therewith, the program instructions executable by a processor to cause the processor to initiate executable operations comprising:
determining a topic and emotive content from a plurality of chat messages of a group chat;
determining time deltas between different ones of the plurality of chat messages;
determining a tempo and a tempo adjustment for the group chat based on the topic, the emotive content, and the time deltas; and
indicating the tempo adjustment to a client device of a participant in the group chat.

20. The computer program product of claim 19, wherein the program instructions are executable by the processor to cause the processor to initiate executable operations comprising:
automatically adjusting the tempo of the group chat based on the tempo adjustment.

* * * * *